United States Patent
Künstle et al.

[11] 3,886,212
[45] May 27, 1975

[54] PROCESS FOR PREPARING N,N,N',N'-TETRAACETYL COMPOUNDS

[75] Inventors: Gerhard Künstle, Raitenhaslach; Hellmuth Spes, Burghausen; Herbert Siegl, Haiming, all of Germany

[73] Assignee: Wacker-Chemie GmbH, 8 Munich 22, Germany

[22] Filed: Feb. 11, 1974

[21] Appl. No.: 441,200

[30] Foreign Application Priority Data
Feb. 19, 1973 Germany............................ 2308119

[52] U.S. Cl....... 260/561 R; 260/561 H; 260/562 R
[51] Int. Cl............................................ C07c 103/44
[58] Field of Search......... 260/561 R, 561 H, 562 R; 252/435

[56] References Cited
UNITED STATES PATENTS
3,539,629  11/1970  MacKellar et al. ............. 260/561 R
3,824,287  7/1974  Matthias et al. ................. 260/561 R

*Primary Examiner*—C. Davis
*Attorney, Agent, or Firm*—Allison C. Collard

[57] ABSTRACT

Process for preparing N,N,N,'N'-tetraacetyl compounds of the general formula

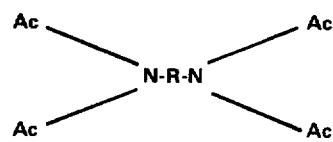

wherein
Ac represents acetyl -OCCH$_3$,
R represents a straight, or branch chained alkylene group with 1 – 12 C-atoms, or equals zero;
or R represents a substituted or unsubstituted phenylene, benzylidene, cyclohexylidene, naphthylene, diphenylene methane or dicyclohexylidene methane group, the preparation being performed by the N-acetylation of N,N'-diacetyl compounds of the general formula

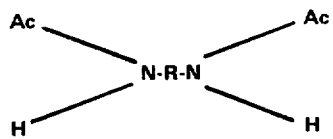

wherein Ac and R have the meaning indicated above, with ketene in the presence of a catalyst and a solvent, the invention consisting of the use of a catalyst of the group consisting of an inorganic fluorine compound of the element boron, silicon, nitrogen, phosphorus, arsenic, antimony, bismuth, titanium, and vanadium, singly or in a mixture.

8 Claims, No Drawings

PROCESS FOR PREPARING N,N,N',N'-TETRAACETYL COMPOUNDS

The present invention relates to a proces for preparing N,N,N',N'-tetraacetyl compounds of the general formula

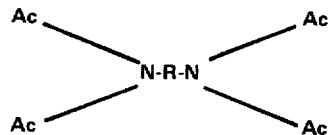

wherein

Ac represents acetyl —OCCH$_3$,

R represents a straight, or branch chained alkylene group with 1 – 12 C-atoms, or equals zero;

or R represents a substituted or unsubstituted phenylene, benzylidene, cyclohexylidene, naphthylene, diphenylene methane or dicyclohexylidene methane group, the preparation being performed by the N-acetylation of N,N'-diacetyl compounds of the general formula

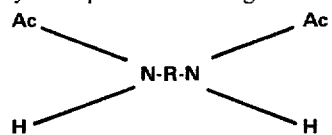

wherein Ac and R have the meaning indicated above, with ketene in the presence of a catalyst and a solvent, the invention consisting of the use of specific catalysts later to be described.

It is known to convert N,N'-diacetyldiamines, for example, diacetylmethylenediamine, into N,N,N', N'-tetraacetyldiamines with ketene in the presence of a catalyst and a solvent. Also capable of the same reaction are compounds in which a hydrogen of the methylene group of N,N'diacetylmethylene-diamine is substituted by an aliphatic, cycloaliphatic or phenyl group, or N,N'-diacetyl-p-phenylene-diamine. (See U.S. Pat. Nos. 3,223,732 and 3,228,983; British Pat. No. 907,357, DAS Nos. 1,200,798 and 1,910,300.)

The use of p-toluene sulfonic acid or sulfuric acid as catalyst (see the two U.S. patent above) leads to a low yield. Moreover, an impure raw product is obtained which requires cumbersome purification. Also, the velocity of reaction is low.

When a higher boiling solvent is used such as butyl acetate, it is possible to increase with the reaction temperature the reaction velocity. In that manner, however, the quality of the raw product is impaired. (See DAS No. 1,200,798).

Phosphoric acid has likewise been used as catalyst. (see DAS No. 1,910,300) In order to obtain high reaction velocity and satisfactory yield, it is necessary to use about 4–6 percent by weight of phosphoric acic calculated on N,N'-diacetyldiamine at a reaction temperature of 50°C; about 2.8 percent of the acid at a reaction temperature of about 95°C. The process is made more difficult by the absolutely necessary removal of the high amount of catalyst from the reaction mixture, which is an additional drawback. Moreover, no uniform raw product is obtained with phosphoric acid as catalyst, especially at high reaction temperatures. It is therefore necessary, in this case, to repeatedly wash the raw product obtained with a solvent, or to extract it. The economy of the process is thereby reduced.

It is the object of the present invention to provide a process for preparing N,N,N',N'-tetraacetyl compounds which is free of the shortcomings of the known methods, and which has other advantages which will become apparent from the following detailed description.

According to the process of the invention, the preparation starts with compounds of the general formula

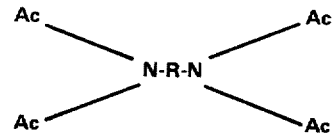

wherein

Ac represents acetyl —OCCH$_3$,

R represents a straight, or branch chained alkylene group with 1 – 12 C-atoms, or equals zero;

or R represents a substituted or unsubstituted phenylene, benzylidene, cyclohexylidene, naphthylene, diphenylene methane or dicyclohexylidene methane group, and is performed by the N-acetylation of N,N'-diacetyl compounds of the general formula

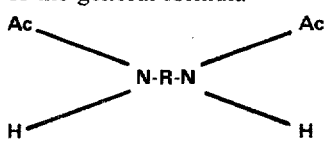

wherein Ac and R have the meaning indicated above, with ketene in the presence of a catalyst and a solvent, the invention consisting of the use of a catalyst of the group consisting an inorganic fluorine compound of the element boron, silicon, nitrogen, phosphorus, arsenic, antimony, bismuth, titanium, and vanadium, singly or in a mixture.

The process can be carried out continuously or discontinuously.

In addition to N,N'-diacetyl hydrazine, we may use in accordance to the invention, N,N'-diacetyl diamines for obtaining the corresponding N,N,N',N'-tetraacetyldiamines, for example: N-N'-diacetylmethylenediamine, N-N'-diacetylethylenediamine, N-N'-diacetyl-1.2-propylenediamine, N-N'-diacetyl-1.3-diaminopropane, N-N'-diacetyl-1.4-diaminobutane, N-N'-diacetyl-1.5-diaminopentane, N-N'-diacetyl-1.6-diaminohexane, N-N'-diacetyl-1.7-diaminoheptane, N-N'-diacetyl-1.8-diaminooctane, N-N'-diacetyl-1.9-diaminononane, N-N'-diacetyl-1.10-diaminodecane, N-N'-diacetyl-1.11-diaminoundecane, N-N'-diacetyl-1.12-diaminododecane; N-N'-diacetyl-1.10-diaminononadecane, N-N'-diacetyl-1.11-diaminononadecane; N-N'-diacetyl-1.2-diaminobenzene, N-N'-diacetyl-1.3-diaminobenzene, N-N'-diacetyl-1.4-diaminobenzene; N-N'-diacetyl-2.4-diaminotoluene; N-N'-diacetyl-2.4-diaminoanisol; N-N'diacetylbenzylidenediamine; N-N'-diacetyl-1.4-diaminocyclohexane; N-N'-diacetyl-1.8-naphtylenediamine; N-N'-diacetyl-4.4'-diaminodiphenyl-methane; N-N'-diacety -.4'-diaminodicyclohexylmethane.

Suitable catalysts are for instance: Boronfluoride (BF$_3$), fluoroboric acid (HBF$_4$), silicontetrafluoride, (SiF$_4$), fluorosilicic acid (H$_2$SiF$_6$), nitrosylfluoride, (NOF), nitrylfluoride (NO$_2$F), phosphorustrifluoride (PF$_3$), phosphoruspentafluoride (PF$_5$), phosphorusoxifluoride (POF$_3$), difluorophosphoric acid (HPO$_2$F$_2$), Hexafluorophosphoric acid (HPF$_6$), Monofluorophosphoric acid (H$_2$PO$_3$F), arsenictrifluoride (AsF$_3$), arsenicpentafluoride(AsF$_5$), hexafluoroarsenic acid (HAsF$_6$), antimonytrifluoride (SbF$_3$), antimonypentafluoride (SbF$_5$), hexafluoroantimonic acid (HSbF$_6$), bismuthtrifluoride (BiF$_3$), titaniumtrifluoride (TiF$_3$), titaniumtetrafluoride (TiF$_4$), vanadiumtrifluoride (VF$_3$) and vanadiumtetrafluoride (VF$_4$). The catalysts may be used singly or in mixtures.

The fluorides may be used with equal success in the form of their etherates or alcoholates.

The catalyst according to the invention are all distinguished by their high selectivity, which varies, however, with the type of catalyst. Moreover, it is affected by the reaction temperature and by the amount and kind of the solvent used.

The most useful catalysts are difluorophosphoric acid, monofluorophosphoric acid, and hexafluorophosphoric acid.

The concentration of the catalyst may depend on the reaction conditions and the kind of catalyst used. In any case, 0.01 – 0.5 percent by weight of the catalyst calculated on the N,N'-diacetyl compound will be sufficient.

The process may be carried out at a temperature of 75° – 150°C, preferably at 75° – 95°C. At this range, a high reaction velocity and a practically pure reaction product will be obtained with the mentioned highly active catalysts in an amount of 0.05 percent by weight, calculated on the N,N'-diacetyl compound.

For most of the applications, especially for the use as activating agents in detergents and bleaches, as well as for pesticides, a further purification of the reaction product as obtained may be dispensed with.

As solvents, we may use any compounds which are inert to the reaction and will dissolve the starting material sufficiently such as aromatic or aliphatic hydro carbon halides.

It is particularly advantageous when the boiling point of the solvent is chosen with respect to the reaction temperature so that the heat generated by the reaction will be removed by the evaporation and condensation of the solvent. It is therefore desirable to use a solvent which boils at the reaction temperature. In this manner, an undesirable crystallization of the reaction product is avoided, and therefor the heat transfer remains unimpaired so that the reaction proceeds effectively.

A suitable solvent is, for example, 1,2-dichloroethane.

It is surprising that in the N-acetylation of N,N'-diacetyl compounds to form N,N,N',N'-tetraacetyl compounds, small quantities of the catalyst according to the invention will be sufficient to cause a high reaction velocity and selectivity. In view of this fact, additional measures for the removal or neutralization of the catalyst are dispensable. In combination with the high space/time yield at low technical equipment expenses, the result is a highly economical process.

As mentioned before, according to the process of this invention, N,N,N',N'-tetraacetyl compounds are obtained in high yields.

The invention will now be more particularly described in a number of examples, which are given by way of illustration and not by way of limitation.

Example 1

An apparatus is used which comprises a stirring vessel equipped with a heating jacket, a highly effective stirrer, and a reflux cooler. Into the vessel, 144 parts by weight of N,N'-diacetylethylene-diamine are first introduced together with 0.05 parts by weight of difluorophosphoric acid and 1,900 parts by volume of 1,2-dichloroethane. The mixture is heated to 80°–85°C. Subsequently, 84 parts by weight of ketene as 87 percent ketene gas are introduced through a bottom immersion tube in the course of about 15 minutes. After termination of the ketene addition, cooling to 15°C with stirring is applied. The contents of the vessel are centrifuged, and the solids obtained are dried in vacuo. Yield: 191 parts by weight of N,N,N',N'-tetraacetylethylene-diamine, pure according to the melting point, and practically colorless. Furthermore, 35 parts by weight of the compound are obtained from the eluate, after distilling off the solvent.

The total yield is 99.0 of the theoretical calculated on N,N'-diacetylethylene -diamine.

The same results are obtained when using instead of 0.05 parts by wieight of difluorophosphoric acid, 0.05 parts by weight of hexa- or monofluorophosphoric acid; or 0.025 parts by weight of titanium tetrafluoride and 0.025 parts by weight difluorophosphoric acid, or 0.025 parts by weight of silicon tetrafluoride and 0.025 parts by weight of hexafluorophosphoric acid, or 0.025 parts by weight of nitrosylfluoride and 0.025 parts by weight of monofluorophosphoric acid, or 0.025 parts by weight of boron fluoride and 0.025 parts by weight of bismuth trifluoride.

Example 2

The apparatus used is the same as in example 1. Into the stirring vessel, 130 parts by weight of N,N'-diacetylmethylene-diamine, 0.05 parts by weight fluoboric acid, and 1,000 parts by volume of benzene are first introduced and heated to refluxing. Subsequently, 84 parts by weight of ketene are added in the course of 15 minutes as described in Example 1. Further workup also occurs as described in Example 1.

Obtained is a total of 205 parts by weight of N,N,N', N'-tetraacetylmethylene-diamine, i.e. 95.8 percent of the theoretical.

EXAMPLES 3 – 12

Apparatus and procedure as in Example 1. The following Table 1 shows the results of the various N,N'-diacetylcompounds reacted with ketene.

TABLE 1

| Example Nos. | Starting Materials N,N'-Diacetyl Compounds | Solvent |
|---|---|---|
| 3 | N,N'-Diacetylhydrazine<br>$CH_3CO—HN—NH—COCH_3$ | 1,2-Dichloroethane |
| 4 | N,N'-Diacetyl-1,3-diaminopropane<br>$CH_3CO—NH—(CH_2)_3—NH—COCH_3$ | " |
| 5 | N,N'-Diacetyl-1.2-Propylenediamine<br>$CH_3CO—NH—CH(CH_3)—CH_2—NH—COCH_3$ | " |
| 6 | N,N'-Diacetyldiaminooctane<br>$CH_3CO—NH—(CH_2)_8—NH—COCH_3$ | " |
| 7 | N,N'-Diacetyldiaminododecane<br>$CH_3CO—NH—(CH_2)_{12}—NH—COCH_3$ | " |

TABLE 1 — Continued

| Example Nos. | Starting Materials N,N'-Diacetyl Compounds | Solvent |
|---|---|---|
| 8 | N,N'-Diacetyl-1.4-diaminobenzene $CH_3CO-NH-(C_6H_4)-NH-COCH_3$ | Ethylacetate |
| 9 | N,N'-Diacetyl-1.8-Naphtylenediamine $CH_3CO-NH-(C_{10}H_6)-NH-COCH_3$ | " |
| 10 | N,N'-Diacetyl-4.4'-diamino-dicyclohexylmethane | " |
| 11 | N,N'-Diacetyl-1.2-diaminocyclohexane $CH_3CO-NH-(C_6H_{10})-NH-COCH_3$ | " |
| 12 | N,N'-Diacetyl-benzylidenediamine $(CH_3CO-NH)_2-CH-C_6H_5$ | " |

| Catalyst Weight % | Reaction Product N,N,N',N'-Tetraacetyl-Compounds | Yield of the Theoretical in % |
|---|---|---|
| 0.05 Hexafluorophosphoric acid | N,N,N',N'-Tetraacetyl-hydrazine | 93.5 |
| 0.1 Hexafluoroantimonic acid | N,N,N',N'-Tetraacetyl-diamino-propane | 90.5 |
| 0.05 Vanadiumtetrafluoride | N,N,N',N'-Tetraacetyl-1.2-propylenediamine | 95.0 |
| 0.05 Boronfluoride etherate 0.025 Phosphorpentafluoride | N,N,N',N'-tetraacetyl-diamino-octane | 93.5 |
| 0.025 Monofluorophosphoric acid 0.05 Difluorophosphoric acid | N,N,N',N'-Tetraacetyl-diamino-dodecane | 94.0 |
| 0.025 Bismuthtrifluoride | N,N,N',N'-Tetraacetyl-1.4-diaminobenzene | 89.0 |
| 0.025 Difluorophosphoric acid 0.025 Vanadiumtetrafluoride 0.05 Hexafluoroarsenic acid | N,N,N',N'-Tetraacetyl-1.8-naphthylenediamine | 90.0 |
| 0.025 Boronfluoride etherate 0.025 Hexafluorophosphoric acid | N,N,N',N'-Tetraacetyl-4.4'-diaminodicyclo-hexylmethane | 94.5 |
| 0.1 Titanium tetrafluoride | N,N,N',N'-Tetraacetyl-1.2-diaminocyclohexane | 91.5 |
| 0.05 Difluorophosphoric acid | N,N,N',N'-Tetraacetyl-benzylidenediamine | 95.5 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for preparing N,N,N',N'-tetraacetyl compounds of the general formula

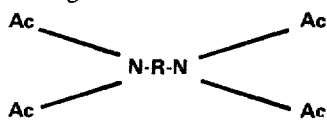

wherein
   Ac represents acetyl $-OCCH_3$,
   R represents a straight or branch chained alkylene group with 1 – 12 C-atoms, or equals zero;
   or R represents substituted or unsubstitured phenylene, benzylidene, cyclohexylidene, naphthylene, diphenylene methane or dicyclohexylidene methane group, by N-acetylation of N,N'-diacetyl compounds of the formula

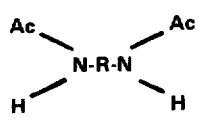

wherein Ac and R have the meaning indicated above, with ketene in the presence of a catalyst and a solvent, the improvement of using as catalyst an inorganic fluorine compound of an element which is selected from the group consisting of boron, silicon, nitrogen, phosphorus, arsenic, antimony, bismuth, titanium, and vanadium, and a mixture of said elements.

2. The process as claimed in claim 1, wherein the catalyst is a member of the group consisting of difluorophosphoric acid, hexafluorophosphoric acid, and monofluorophosphoric acid.

3. The process according to claim 1, wherein the concentration of the catalyst is in the range of 0.01 – 0.5 percent by weight calculated on the N,N'-diacetyl compound.

4. The process according to claim 1, wherein the reaction is carried out at a temperature ranging from 75° to 150°C.

5. The process according to claim 4, wherein the reaction is carried out at a temperature ranging from 75° to 95°C.

6. The process according to claim 1, wherein a solvent is used which boils at the reaction temperature.

7. The process according to claim 6, wherein the solvent is 1,2-dichloroethane.

8. The process according to claim 6, wherein the solvent is ethylacetate.

* * * * *